United States Patent Office 2,917,563
Patented Dec. 15, 1959

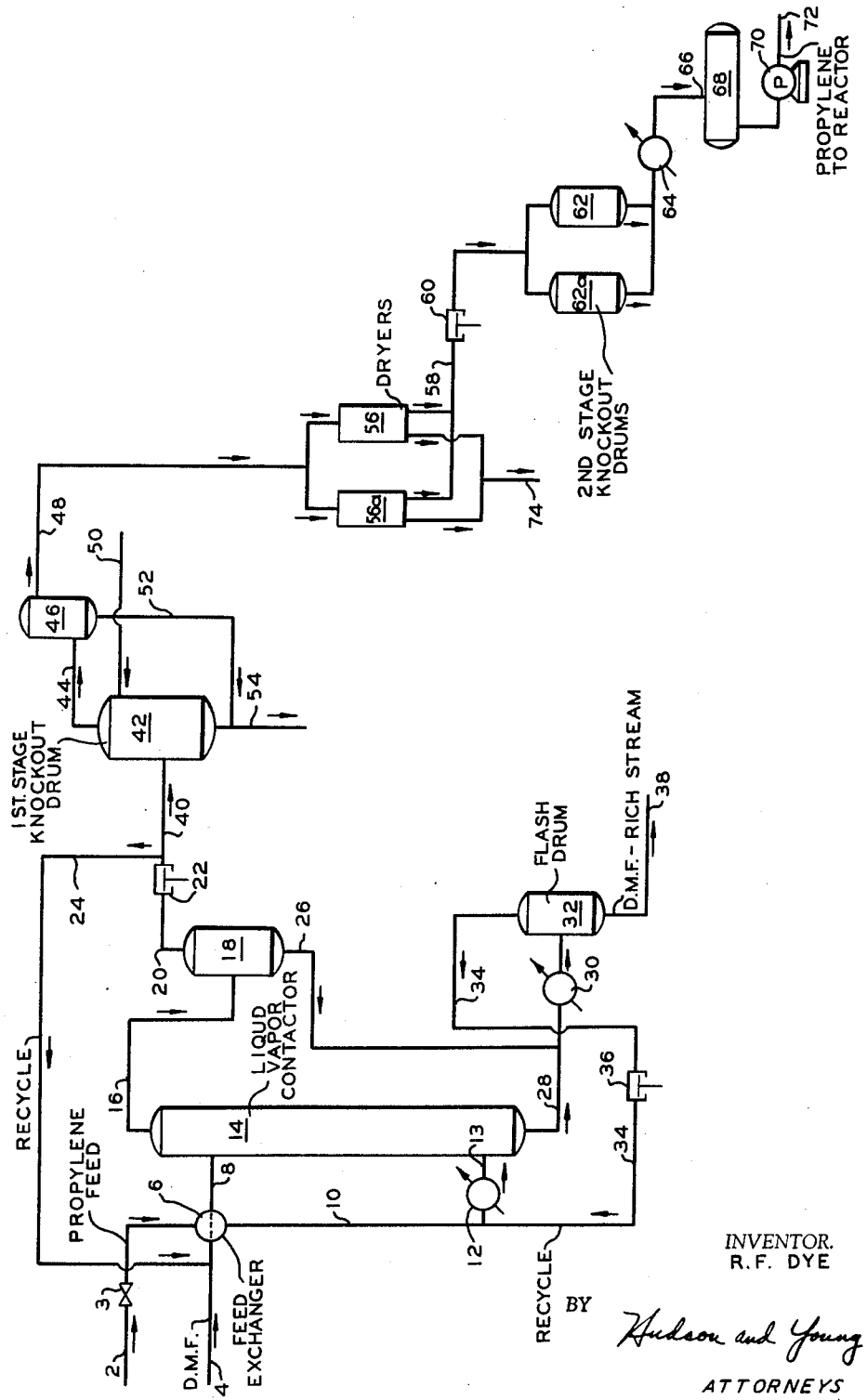

2,917,563
SEPARATION OF ALKYNES FROM OLEFINS

Robert F. Dye, Bartlesville, Okla., assignor to Phillips Petroleum Company, a corporation of Delaware Application May 1, 1957, Serial No. 656,277

10 Claims. (Cl. 260—677)

This invention relates to the treatment of a hydrocarbon mixture to remove one or more components therefrom. In one aspect of the invention it relates to the removal of an alkyne from a hydrocarbon mixture comprising said alkyne and an olefin having similar boiling points.

The term "similar boiling points" is used herein in relation to compounds which are sufficiently close in boiling point to make their separation by conventional fractionation difficult or impossible.

Olefins normally produced in refining or other operations usually contain impurities such as paraffins and acetylene compounds having boiling points similar to the olefins. For example, hydrocarbon streams rich in propylene may contain propane, ethane, $C_4$ olefins, propyne, allene, etc. When an olefin such as propylene is to be used in a catalytic polymerization process it is desirable to remove propyne which is undesirable in the polymerization reaction zone. Conventional methods for effecting the separation of propyne from propylene are complicated and expensive due to the low relative volatility of propylene as compared to propyne. For example, when operating at normal temperatures the relative volatility of propylene with respect to propyne is 1.1:1 to 1.2:1, and separation of these compounds requires a large column and a high reflux ratio when the separation is effected by distillation.

It is an object of this invention to provide an improved process for the separation of olefins and alkynes.

Another object of this invention is to provide an improved process for the separation of an alkyne from a hydrocarbon mixture containing said alkyne and an olefin having similar boiling points.

Still another object of this invention is to provide an improved process for the separation of propyne from a hydrocarbon mixture containing propylene.

These and other objects of the invention will become more readily apparent from the following detailed description and discussion.

In the method of this invention the foregoing objects are achieved broadly by expanding and vaporizing a hydrocarbon feed mixture containing an olefin and an alkyne having similar boiling points in indirect heat exchange with dimethylformamide solvent, thereafter contacting the hydrocarbon vapors with said solvent in a contacting zone whereby the alkyne is selectively absorbed in said solvent and recovering an olefin containing hydrocarbon mixture essentially free of alkyne.

In one aspect of the invention the hydrocarbon feed mixture is expanded to a pressure below the liquid vapor pressure at ambient temperature whereby all of said feed mixture is vaporized, the temperature of the dimethylformamide is reduced to the operating temperature in the contacting zone and the vaporized hydrocarbon feed is thereafter heated to the operating temperature in the contacting zone.

In another aspect of the invention the pressure on the solvent stream leaving the contacting zone is reduced whereby absorbed olefin is vaporized and said olefin is returned to the contacting zone.

In still another aspect of the invention a portion of the alkyne free hydrocarbon product is combined with the dimethylformamide solvent prior to passing said solvent in indirect heat exchange with the fresh hydrocarbon feed mixture.

This invention is applicable in general to the treatment of hydrocarbon mixtures containing an olefin and an alkyne having similar boiling points. The terms "olefin" and "alkyne" as used herein are intended to have the usual meanings and include compounds such as propylene, butenes, isobutenes, pentenes, etc. and propyne, butynes, pentynes, etc. In addition the hydrocarbon mixtures can contain other materials including paraffin hydrocarbons such as propane, butane, isobutane, pentane, isopentane, etc. The invention is particularly applicable in the treatment of refinery gas streams and finds utility in providing suitable feed materials for use in various processes such as alkylation, polymerization, etc.

Specific mixtures to which the invention applies are propylene-propyne; butene-1 and/or butene-2-butyne-1; pentene-1 and/or pentene-2-pentyne-1; and the like. The invention will be described by particular reference to the system propylene-propyne. This is not intended however in any limiting sense and the treatment of other hydrocarbon mixtures containing olefin and alkynes having similar boiling points is also within the scope of the invention.

In carrying out the invention in one embodiment thereof a liquid hydrocarbon mixture comprising, for example, propylene and propyne is expanded whereby the hydrocarbons vaporize and the vapors are passed in indirect heat exchange with dimethylformamide solvent. The cooling which results from the expansion reduces the hydrocarbon vapors to subatmospheric temperature and in the subsequent heat exchange the temperature of the dimethylformamide solvent is substantially reduced. The temperature and pressure conditions employed in this operation can vary. For example, all of the hydrocarbon mixture need not be vaporized, however, preferably the pressure is reduced to a sufficient level to provide complete varoporization. Usually the pressure on the hydrocarbon mixture after expansion is between about 60 and about 75 p.s.i.a. and the hydrocarbon mixture is reduced in temperature to between about 5 and about 15 degrees F. In the heat exchange step the dimethylformamide solvent is preferably cooled to a temperature which approximates the temperature of the subsequent contacting step hereinafter described. Usually this temperature is between about 20 and about 30 degrees F. Inasmuch as the hydrocarbon feed subsequently enters the contacting zone it is desirable that the temperature of this material also be established at about the same level as the temperature in said zone. For this purpose the hydrocarbon gases, after their heat exchange with the dimethylformamide, can be heated, such as by passing them in indirect heat exchange with a heated liquid or vapor, for example steam.

Following the heat exchange operations the dimethylformamide solvent and hydrocarbon vapors are introduced to a contacting zone in contact with each other whereby propyne is preferentially absorbed by the solvent. The unabsorbed hydrocarbon vapors are removed from the contacting zone and treated in a series of operations for the removal of entrained dimethylformamide and drying, to provide a feed material for use in processes such as alkylation, polymerization, etc. The liquid extract from the contacting zone, predominantly dimethylformamide solvent, contains absorbed propyne and also a substantial amount of propylene. To remove the propylene this material is heated whereby the propylene is preferentially vaporized and the vapor is recycled to the contacting zone. The solvent, containing propyne, is then subjected to a suitable separation operation, such as stripping, to remove the propyne and allow the solvent to be reused in the process.

The conditions required to separate the propylene from the extract depend principally on the quantity of propylene in said extract. Usually substantially complete removal of the propylene is effected by heating the extract to a temperature of between about 80 and about 90 degrees F. and reducing the pressure to about atmospheric.

Since the equilibrium conditions in the contacting zone provide for an extract containing a substantial amount of propylene it has been found desirable to presaturate the solvent before this material is introduced to the contacting zone. This minimizes variations in temperature in the contacting zone and allows for a more even contactor operation. A portion of the overhead from the contacting zone, sufficient to saturate the dimethylformamide feed, is recycled to this feed stream before it passes in heat exchange with the hydrocarbon feed. When operating in the range of contacting temperatures given it is necessary in order to provide presaturation to introduce to the solvent feed stream a sufficient amount of propylene to provide a composition containing between about 25 and about 30 percent propylene by weight.

The preceding discussion has been directed to a process in which the hydrocarbon feed comprises an alkyne and an olefin. Frequently the olefin containing mixture to be treated contains other paraffins and olefins which may be detrimental in the subsequent use of the olefin. In such instances it is within the scope of the invention to subject the hydrocarbon material which has been freed of alkyne to further treatment to remove other compounds, for example by fractionation, and thus provide a substantially pure olefin feed material.

By operating in accordance with the preceding methods, it has been found that optimum conditions to provide the most favorable absorption factors and thus the best and most efficient removal of alkyne from olefin are attained by carefully controlling the pressure to which the hydrocarbon feed is expanded before the heat exchange step. Thus it is possible to obtain an optimum separation factor in conjunction with a minimum recompression energy required to recompress and condense the olefin containing hydrocarbon mixture for such further use of this material as is contemplated. It has been found for example that when operating with the system propylene-propyne the optimum pressure of expansion is about 65 p.s.i.g. With a lower expansion pressure an improvement in the separation factor is obtained but this advantage is more than offset by the higher recompression energy requirements. Similarly, a higher expansion pressure reduces the recompression energy required, but is more than offset by the poorer separation factor obtained.

In order to more clearly describe the invention and provide a better understanding thereof reference is had to the accompanying drawing which is a diagrammatic illustration of a heat exchanger, a liquid-vapor contactor and associated equipment suitable for carrying out the invention in one embodiment thereof. Referring to the drawing, a hydrocarbon mixture comprising propylene and a small amount of propyne is introduced through conduit 2 and passes through expansion valve 3 wherein the pressure is lowered to a sufficient level to provide vaporization of the hydrocarbons. The vapors are passed in indirect heat exchange through feed exchanger 6 to provide cooling of dimethylformamide solvent introduced to said exchanger through conduit 4. As a result of the heat exchange the hydrocarbon vapors are increased in temperature and the dimethylformamide is reduced in temperature, the latter stream being passed from the exchanger through conduit 8 and introduced to the upper portion of liquid-vapor contactor 14. The hydrocarbon vapors leaving exchanger 6 through conduit 10, are joined by recycle propylene from conduit 34 and the mixture passes through heater 12 and conduit 13 into the lower portion of contactor 14. Within the contactor ascending vapors are scrubbed by descending solvent whereby propyne present in the vapors is selectively absorbed in the solvent. The hydrocarbon vapors, denuded of propyne pass overhead from the contactor through conduit 16 and into knockout drum 18 whereby entrained liquid is removed from the vapors and returned to the contactor through conduits 26 and 28. The vapors from this vessel then pass through conduit 20 to the suction of compressor 22 wherein the pressure is substantially increased. The material discharged from the compressor is divided into two portions with a part being recycled through conduit 24 to the dimethylformamide solvent entering the contactor, as previously described, and the remainder being passed through conduit 40 into the first stage knockout drum 42. In this vessel the vapors are contacted with a water spray introduced through conduit 50 whereby any entrained solvent is removed and discharged from the bottom of the knockout drum through conduit 54.

The vapors which remain after the scrubbing operation exit overhead through conduit 54 and enter a secondary drum 46. Entrained liquid is removed from this drum, joining the liquid from drum 42 through conduit 52. The vapors are then passed through conduit 48 to dryers 56 wherein water is removed. A second stage compression of the vapors takes place in compressor 60, with the vapors passing first to knockout drum 62 and 62A, then through condenser 64 and conduit 66 into accumulator 68. The remaining contactor overhead is now in the liquid state and is thus suitable for introduction, for example, to a liquid phase polymerization process. The liquid feed is withdrawn from the accumulator through pump 70 and discharged through conduit 72 to a reactor zone (not shown) wherein it enters into a polymerization reaction.

The bottoms from liquid vapor contactor 14, comprising substantially all of the dimethylformamide solvent, all of the propyne and a portion of the propylene travel via conduit 28 and heater 30 into flash drum 32. In this drum substantially all of the propylene present in the bottoms is vaporized, passing overhead from the flash drum through conduit 34 into compressor 36 and from there entering the contactor with the vaporized hydrocarbon feed, as previously described. A stream rich in dimethylformamide is withdrawn from the flash drum through conduit 38. This material can be further processed (not shown) to remove propyne and reused, as desired, in the process.

The following example is presented in illustration of an application of the invention on a commercial scale.

EXAMPLE

Flows

| | lb./SD |
|---|---|
| Propylene feed (2) | 17,585 |
| Composition: | Weight percent |
| Propylene | 81.30 |
| Propane | 17.85 |
| Methylacetylene | 0.45 |
| Heavier hydrocarbon | 0.40 |
| Fresh DMF (4) | 16,800 |
| Absorber overhead (16) | 22,231 |
| Composition: | Weight percent |
| Propylene | 81.60 |
| Propane | 18.00 |
| Heavier hydrocarbons | 0.40 |
| DMF | Trace |
| Overhead recycle (24) | 6,494 |
| Composition—same as absorber overhead. | |
| Propylene to Reactor (72) | 15,733 |
| Composition—same as absorber overhead. | |

| | lb./SD |
|---|---|
| Absorber bottoms (28) | 24,021 |
| Composition: | Weight percent |
| Propylene | 24.25 |
| Propane | 5.25 |
| DMF | 69.61 |
| Methylacetylene | 0.50 |
| Heavier hydrocarbons | 0.09 |
| Bottoms recycle (34) | 5,373 |
| Composition: | Weight percent |
| Propylene | 81.17 |
| Propane | 17.70 |
| Methylacetylene | 0.76 |
| Heavier hydrocarbons | 0.37 |

*Temperatures*

| | °F. |
|---|---|
| Propylene to feed exchanger (2) | 100 |
| Propylene from feed exchanger (10) | 15 |
| DMF to feed exchanger (4) | 100 |
| DMF from feed exchanger (8) | 20 |
| Propylene to DMF absorber (13) | 15 |
| DMF absorber (14): | |
| Top | 20 |
| Bottom | 22 |
| 1st stage knockout drum (42) | 100 |
| 2nd stage knockout drum (62 and 62a) | 265 |
| Flash drum (32) | 22 |

*Pressures*

| | P.s.i.a. |
|---|---|
| Propylene to feed exchanger (2) | 210 |
| Propylene from feed exchanger (10) | 75 |
| DMF absorber (14): | |
| Top | 55 |
| Bottom | 60 |
| 1st stage knockout drum (42) | 65 |
| 2nd stage knockout drum (62 and 62a) | 235 |
| Flash drum (32) | 15 |

Having thus described the invention by providing a specific example thereof, it is to be understood that no undue limitations or restrictions are to be drawn by reason thereof and that many variations and modifications are within the scope of the invention.

I claim:

1. A method for removing an alkyne from a hydrocarbon mixture comprising an olefin and an alkyne having similar boiling points in which the hydrocarbon mixture is contacted in a contacting zone with a solvent which comprises expanding and vaporizing said mixture in indirect heat exchange with dimethylformamide solvent whereby said solvent is reduced in temperature to the temperature of the contacting zone, said hydrocarbon mixture and said solvent being substantially at the same temperature prior to said heat exchange heating the vaporized hydrocarbon mixture to raise the vapors to the temperature in the contacting zone, contacting the hydrocarbon vapors with said solvent in said contacting zone whereby the alkyne is selectively absorbed in said solvent and recovering said hydrocarbon mixture essentially free of alkyne.

2. The method of claim 1 in which the hydrocarbon mixture comprises propylene and propyne.

3. The method of claim 1 in which the hydrocarbon mixture comprises a butene and a butyne.

4. The method of claim 1 in which the hydrocarbon mixture comprises a pentene and a pentyne.

5. A method for removing an alkyne from a hydrocarbon mixture comprising an olefin and an alkyne having similar boiling points in which the hydrocarbon mixture is contacted in a contacting zone with a solvent which comprises expanding and vaporizing said mixture in indirect heat exchange with dimethylformamide solvent whereby said solvent is reduced in temperature to the temperature of the contacting zone, said hydrocarbon mixture and said solvent being at substantially the same temperature prior to said heat exchange heating the vaporized hydrocarbon mixture to raise the vapors to the temperature in the contacting zone, contacting the hydrocarbon vapors with said solvent in said contacting zone whereby the alkyne is selectively absorbed in said solvent along with a portion of the olefin, removing the solvent from the contacting zone and heating the solvent to release absorbed olefin, recycling the released olefin to the contacting zone and recovering from the contacting zone said hydrocarbon mixture essentially free of alkyne.

6. The method of claim 5 in which the hydrocarbon mixture comprises propylene and propyne.

7. A method for removing an alkyne from a hydrocarbon mixture comprising an olefin and an alkyne having similar boiling points in which said mixture is contacted in a contacting zone with a solvent which comprises expanding and vaporizing said mixture in indirect heat exchange with dimethylformamide solvent, saturated with olefin in a manner hereinafter described, to decrease the temperature of said solvent to the temperature in the contacting zone, said hydrocarbon mixture and said solvent being at substantially the same temperature prior to said heat exchange heating the vaporized hydrocarbon mixture to the temperature in the contacting zone, contacting the hydrocarbon vapors with said solvent in said contacting zone whereby the alkyne is selectively absorbed in said solvent along with a portion of the olefin, removing the solvent from the contacting zone, heating the solvent to release the absorbed olefin and returning the olefin to the contacting zone, recovering a hydrocarbon stream essentially free of alkyne and combining a portion of said stream with the dimethylformamide solvent to provide olefin saturation of said solvent prior to the cooling of said solvent in indirect heat exchange with the vaporized hydrocarbon mixture.

8. The method of claim 7 in which the hydrocarbon mixture comprises propylene and propyne.

9. The process of claim 8 in which the hydrocarbon mixture contains propane which is separated from the alkyne-free product by fractionation.

10. A method for removing propyne from a hydrocarbon mixture comprising propyne and propylene in which said mixture is contacted in a contacting zone with a solvent at a temperature between about 20 and about 30° F. which comprises expanding and vaporizing said mixture to between about 60 and about 75 p.s.i.a. in indirect heat exchange with dimethylformamide solvent, saturated with propylene in a manner hereinafter described, whereby the temperature of the hydrocarbon mixture is decreased to between about 5 and about 15° F. and the temperature of said solvent is decreased to the temperature in the contacting zone, said hydrocarbon mixture and said solvent being at substantially the same temperature prior to said heat exchange heating the vaporized hydrocarbon mixture to the temperature in the contacting zone, contacting the hydrocarbon vapors with said solvent in said contacting zone whereby propyne is selectively absorbed in said solvent along with a portion of the propylene, removing the solvent from the contacting zone, treating the solvent to release absorbed propylene and returning the propylene to the contacting zone, recovering a hydrocarbon stream essentially free of propyne and combining a portion of said stream with the dimethylformamide solvent to provide olefin saturation of said solvent prior to cooling said solvent in indirect heat exchange with the vaporized hydrocarbon mixture.

References Cited in the file of this patent

UNITED STATES PATENTS

| 2,241,716 | Robert et al. | May 13, 1941 |
| 2,250,925 | Babcock | July 29, 1941 |
| 2,341,812 | Pierotti et al. | Feb. 15, 1944 |
| 2,754,930 | Irvine | July 17, 1956 |

OTHER REFERENCES

Howard et al.: Petroleum Refiner, vol. 33, No. 1, pp. 143–6 (January 1954).